United States Patent Office 3,383,269
Patented May 14, 1968

3,383,269
DEVICE FOR SEPARATING THE SIDE WALLS OF BAG FORMED ON A PACKAGING MACHINE
Georg Kopp, Neuhausen am Rheinfall, Switzerland, assignor to Schweizerische Industrie-Gesellschaft, Neuhausen am Rheinfall, Switzerland
Filed Oct. 6, 1965, Ser. No. 493,468
Claims priority, application Switzerland, Nov. 11, 1964, 15,349/64
2 Claims. (Cl. 156—553)

The present invention relates to a device for separating the side walls of bags formed on a packaging machine.

It is known to manufacture filled bags in which a strip running off a supply roll is wrapped round a hollow mandrel by means of a forming shoulder and welded with longitudinal and transverse seams. The contents to be packed in the bag are introduced through the hollow mandrel and the bag is then sealed and cut off. Such machines are somewhat high in construction and this is often undesirable.

It is also known to manufacture packaging bags from two strips which, for example, are passed together through guide rollers and are then welded longitudinally and transversely by passing through welding rollers. Bags manufactured in this way are closed after the welding of the two longtiudinal seams and the bottom transverse seam, that is, their side walls lie flat against each other. To enable these bags to be filled, means, for example hollow mandrels, have to be provided which hold the necks of the bags open, that is they part the side walls so that the contents can be inserted into the bags. Thereafter the upper transverse seams are welded across the bags.

The present invention seeks to provide on such a bag machine a device which causes the top of the bag to remain open during welding so that the contents to be packed therein can be inserted without recourse to providing additional means for separating the side walls.

According to the present invention there is provided a device for separating the side walls of bags formed on a packaging machine from two strips of weldable material welded together by means of welding jaws, in which a guide is arranged in the path of travel of the strips in front of the welding jaws which folds the separate strips approaching it and guides them simultaneously to the welding jaws, the guide having concave guide surfaces on its opposing side walls and convex guide surfaces on its walls arranged at an angle to the side walls such that all points of the strips moving over these guide surfaces traverse the same path length.

The invention will be further described, by way of example, with reference to the accompanying drawings, in which.

Figure 1:
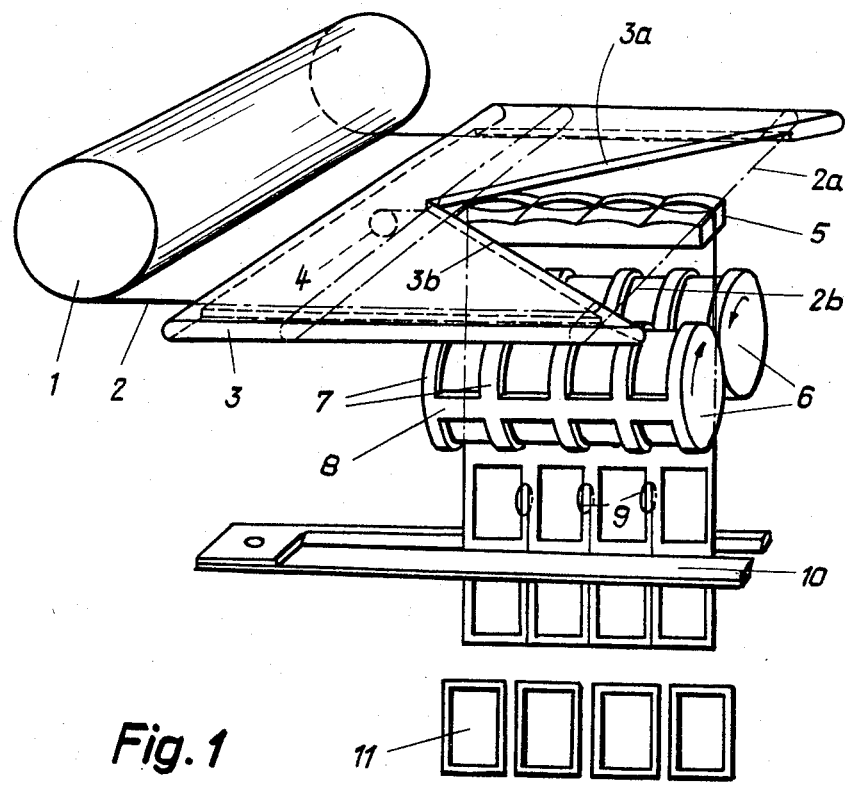
FIG. 1 is a perspective view of the device.
Figure 2:
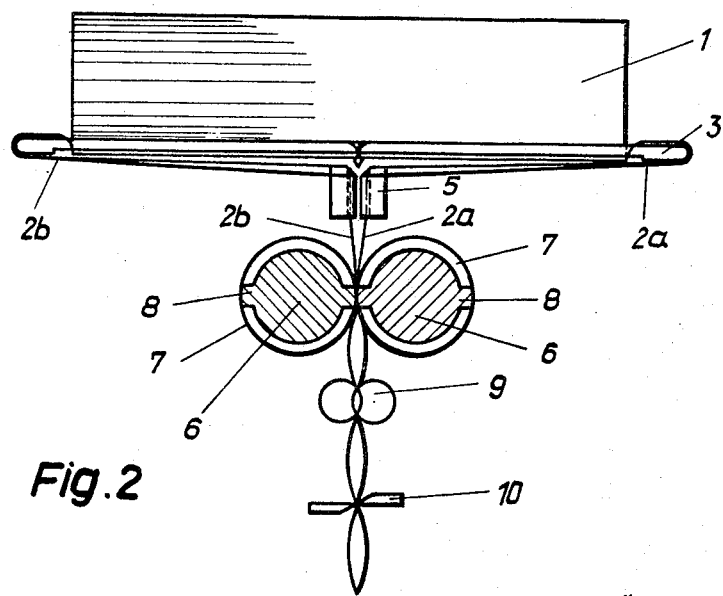
FIG. 2 is a view of the device from in front, in which the welding jaws are shown in section.

A web 2 drawn off a supply roll 1 is passed beneath a guide plate 3 where it is slit longitudinally down the middle by a knife 4 to form two strips 2a, 2b. The plate 3 has a V-shaped notch with inclined edges 3a, 3b. The two strips 2a, 2b pass over these inclined edges in an upwards direction and round the outer edges of the plate 3 in a downward direction again where they are guided together through guide bars 5 and pass simultaneously between welding jaws 6. These welding jaws are rotated in the direction of the arrows by a means which is not shown so that they serve also to feed the strips 2a, 2b through the device. In the example shown in the drawings each jaw is provided with five circumferential ribs 7 and two longitudinal ribs 8 displaced at 180° to each other. The ribs 7 serve for the production of longitudinal seams and the ribs 8 for the production of transverse seams. Four joined bags are therefore produced simultaneously and these are separated into individual bags 11 beneath the welding jaws by circular cutters 9 and a transverse shear 10.

Figure 3:
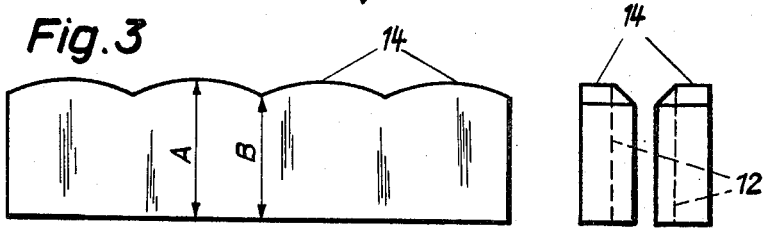
FIGS. 3, 4 and 5 are views of the guides for the strip in front elevation, side elevation and plan.
Figure 4:
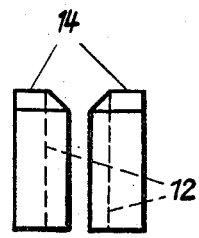
Figure 5:
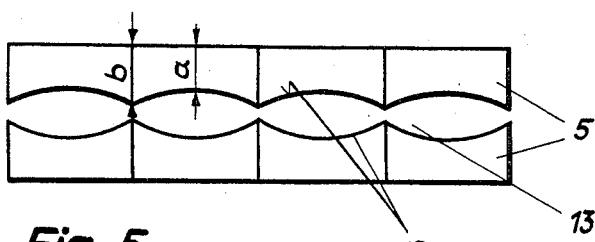

The configuration of the guide bars 5, are shown to a larger scale in FIGS. 3, 4 and 5. In order that a free filling opening may remain at the top of the bags formed from the two strips 2a, 2b during welding, the strips are deformed during their passage past the upper and lateral guide faces of the bars. For this purpose both guide bars 5 have perpendicular concave guide surfaces 12 on their opposing side walls so that gaps 13 occur between the two bars. In order that the strips passing through shall be caused to lie against these surfaces 12 the upper sides of the bars have convex guide surfaces 14 which are so formed that the distances $A+a=B+b$ (see FIG. 5). In this way all points of the strips sliding over the guide faces traverse the same length of path. The strips therefore cannot lift off the guide surfaces 12 and 14.

It will not be realized that instead of the plate 3, the knife 4 and the single supply roll 1, two supply rolls can be arranged parallel to the welding jaws 6 and from which two separate strips can be supplied direct to the guide bars 5. Also the guide bars 5 and the welding jaws 6 can be so formed that, for instance, only one single bag corresponding to the width of the strips 2a, 2b, is produced or any other number of bags can be formed.

I claim:

1. A device for separating the side walls of bags formed on a packaging machine by the welding together of two strips of material comprising welding jaws for welding together said strips and a guide arranged in the path of travel of the strips in front of the welding jaws to lead the two separate strips simultaneously to the welding jaws the guide having concave guide surfaces on opposing side walls thereof and convex guide surfaces on walls thereof disposed at an angle to the side walls, such that all points of the strips moving over said guide surfaces traverse the same path length.

2. A device according to claim 1 including a cutter knife and a plate arranged in the path of travel of material in front of said guide, said plate having V-shaped guide edges and co-operating with said knife to cut material entering the device into two strips and to lead the strips to the guide.

References Cited

UNITED STATES PATENTS

| 2,374,504 | 4/1945 | Salfisberg | 156—582 |
| 3,068,933 | 12/1962 | Klar | 156—582 |
| 3,074,214 | 1/1963 | Schneider et al. | 53—180 |

DOUGLAS J. DRUMMOND, *Primary Examiner.*